No. 648,365. Patented Apr. 24, 1900.
W. A. WYNN.
GATE HINGE.
(Application filed May 31, 1899.)
(No Model.)
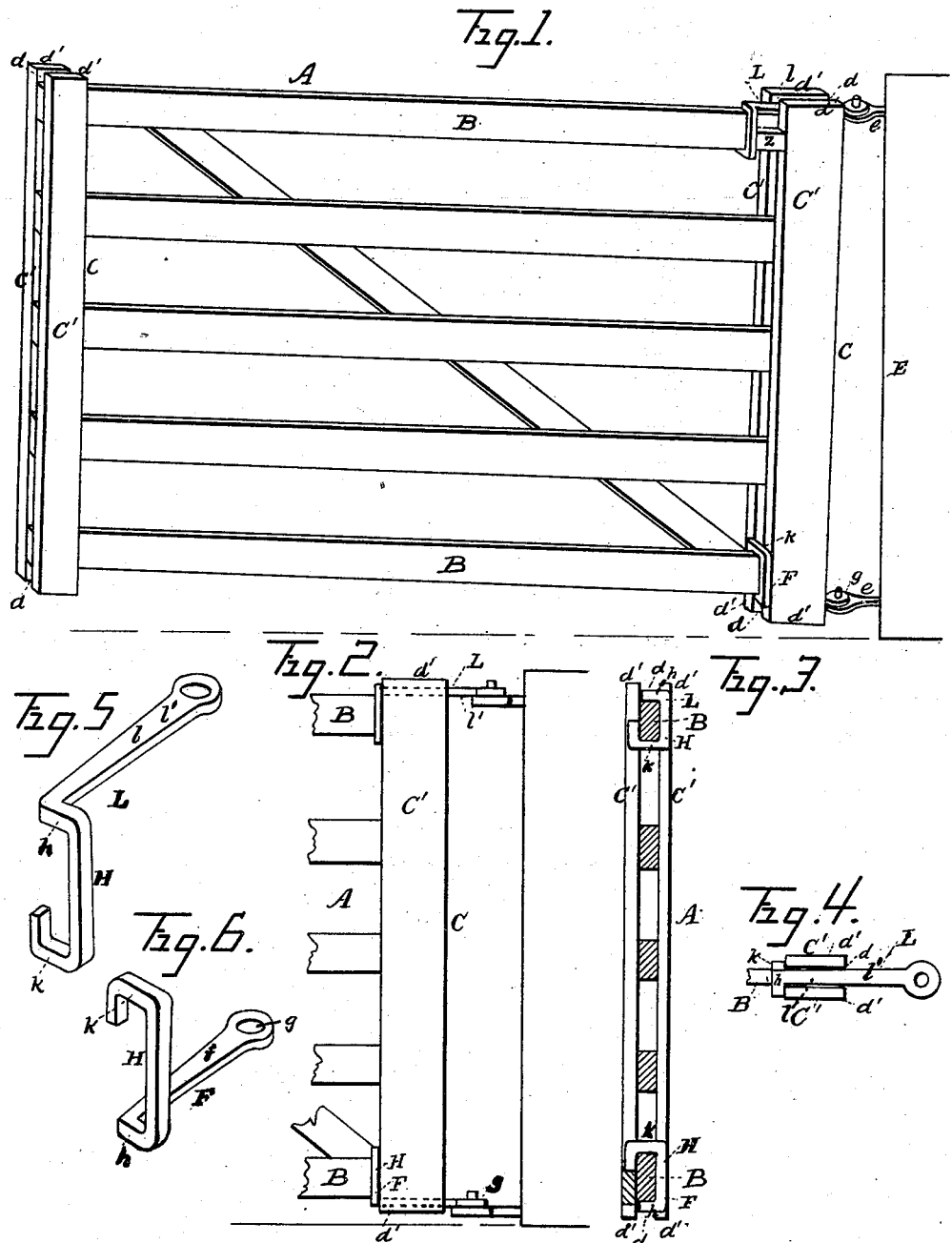

UNITED STATES PATENT OFFICE.

WILLIAM A. WYNN, OF PIKETON, OHIO.

GATE-HINGE.

SPECIFICATION forming part of Letters Patent No. 648,365, dated April 24, 1900.

Application filed May 31, 1899. Serial No. 719,086. (No model.)

*To all whom it may concern:*

Be it known that I, WILLIAM A. WYNN, a citizen of the United States, residing at Piketon, in the county of Pike and State of Ohio, have invented a new and useful Boltless Gate-Hinge, of which the following is a specification.

Referring to the accompanying drawings, Figure 1 is a side view; Fig. 2, a partial side view; Fig. 3, a sectional view, and Figs. 4, 5, and 6 represent details of the invention.

The letter A designates a gate having the upper and lower horizontal bars B and the end uprights C, between which said horizontal bars are secured. These bars are parallel to each other and at each end extend between the parallel boards C', composing the end upright, the upper and lower ends of said boards extending respectively above and below the upper and lower horizontal bars B in such manner as to provide a longitudinal channel or recess bearing $d$ between the projections or extensions $d'$ of said boards.

E represents the gate-post, to which the butt portions $e$ of the hinges are attached. These butt portions may be of ordinary form.

F indicates the lower detachable hinge-section, having at one end of its lower horizontal shank $f$ an eye $g$ and at the other end thereof a lateral upward hook portion H, the plane of which is at right angles to the length of the shank $f$. The lower portion of the main vertical bar of this hook is connected to the end of the shank by a short transverse bend or angle portion $h$, and the upper portion of the same is extended angularly in a direction parallel to said bend $h$, forming the hook $k$, which is transversely longer than the bend $h$, so that it can be hooked over the upper edge of the lower horizontal bar near the upright, and then the shank portion can be brought into the channel or recess between the end extensions of said upright. A lock is thus effected for this hook-hinge section which can then be engaged with the pintle of the part $e$ of the hinge. This hinge-section is readily placed in position on the gate without disturbing its parts and without the use of nails or screws. Its shank is formed without stop or projection, so that it can be readily put in position or detached from the gate.

L indicates the upper hinge-section, which is of similar form to the lower hinge-section, its hook portion being, however, usually reversed. Its horizontal shank $l$ is made long, so that it extends some distance beyond the outer edge of the upright when in normal position, the extension being indicated at $l'$. This hinge-section is first hooked under the upper bar in angular position, and then moved along said bar until its shank is seated in the channel or recess between the projecting ends of the upright boards and upon the end portion of the upper horizontal bar. The extension $l'$ of the shank is of about the same sectional size as said shank, which is formed without obstruction, so that it can be moved freely lengthwise in the channel or recess $d$.

Should the gate sag down at its free end, it can be raised to the proper level and secured in such position by placing a small stick or stone or other casual key between the vertical bar of the hook portion of the hinge and the edge of the upright board, as indicated at $z$. The extension $l'$ of the shank provides for this adjustment of the gate with reference thereto. By a similar adjustment the gate can be raised in front sufficiently to permit the passage thereunder of swine and other small animals when it is so desired.

Having described this invention, what I claim, and desire to secure by Letters Patent, is—

1. A gate-hinge section, comprising a long shank portion, having all its lateral surfaces continuous and unobstructed, and provided with an eye at one end, and at its opposite end a hook portion at right angles to said shank, substantially as specified.

2. The combination with a gate, having a channel at the upper extremity of its hinge-post and a lower hinge having a connection with its support which will allow the gate a pivotal movement in a vertical plane, of an upper hinge-section provided with the long shank portion having all its lateral surfaces continuous and uninterrupted, slidingly engaging said channel, and having an eye at one extremity thereof, and at its opposite extremity, a hook at right angles thereto, said hook having a sliding engagement with the upper longitudinal bar of the gate, substantially as specified.

WILLIAM A. WYNN.

Witnesses:
F. E. DOUGHERTY,
W. S. JONES.